United States Patent [19]

Sugawara

[11] Patent Number: 5,555,248
[45] Date of Patent: Sep. 10, 1996

[54] TANDEM CONNECTION MAINTENANCE SYSTEM

[75] Inventor: Eiji Sugawara, Kawasaki, Japan

[73] Assignee: Fujitu Limited, Kawasaki, Japan

[21] Appl. No.: 213,957

[22] Filed: Mar. 16, 1994

[30] Foreign Application Priority Data

Sep. 20, 1993 [JP] Japan .................................. 5-233507

[51] Int. Cl.$^6$ ...................................................... G06F 11/00
[52] U.S. Cl. ........................ 371/5.1; 371/20.1; 371/49.1; 370/14
[58] Field of Search ............................ 371/5.1, 48, 49.1, 371/20.1, 29.1, 47.1, 11.2; 370/13, 14, 16, 17

[56] References Cited

U.S. PATENT DOCUMENTS

| | | |
|---|---|---|
| 4,964,112 | 10/1990 | Appelmann . |
| 5,251,204 | 10/1993 | Izawa et al. ............................ 370/13 |
| 5,313,453 | 5/1994 | Uchida et al. ......................... 370/13 |

FOREIGN PATENT DOCUMENTS 0344534  12/1989  European Pat. Off. .
0503486   9/1992  European Pat. Off. .

OTHER PUBLICATIONS

Klein, M. J., "The Synchronous Digital Hierarchy: Principles, Variants and Applications", Phillips Telecomm. Review, vol. 48, No. 4, Dec. 1990, pp. 20–27.

Wiechers, R., "Synchronous Digital Hierarchy: A new standard is changing the world", Funkschau 14/1991, pp. 56–62.

*Primary Examiner*—Robert W. Beausoliel, Jr.
*Assistant Examiner*—Phung My Chung

[57] ABSTRACT

A method and apparatus for detecting the presence or absence of errors caused along a designated section of a virtual path established within a communication network. The number of errors is detected at both the entrance and exit of a detection section. The number of errors detected at the entrance is transmitted to the exit by using a path overhead of a virtual path to be monitored, and the number of errors at the entrance is subtracted from the number of errors at the exit, thereby calculating the number of errors caused along the detection section. The path overhead containing data on the detected error count includes a parity compensation bit that is set so that the parity carried in the path overhead remains unchanged. This eliminates the need to recalculate bit interleave parity-2 for the virtual path under monitoring.

18 Claims, 8 Drawing Sheets

| IEC | | | COMP | | F-IEC | | |
|---|---|---|---|---|---|---|---|
| 1 | 2 | 3 | 4 | 5 | 6 | 7 | 8 |

Fig.6

| P | IEC | | COMP | | F-IEC | | |
|---|---|---|---|---|---|---|---|
| 1 | 2 | 3 | 4 | 5 | 6 | 7 | 8 |

Fig.7

| IEC | | P1 | F-IEC | | P2 | COMP | |
|---|---|---|---|---|---|---|---|
| 1 | 2 | 3 | 4 | 5 | 6 | 7 | 8 |

TANDEM CONNECTION MAINTENANCE SYSTEM

BACKGROUND OF THE INVENTION

1. Field of the Invention

The present invention relates to a method and apparatus for detecting errors for each of a plurality of virtual paths established along a designated section within a communication network, and more particularly to a method and apparatus for performing tandem connection maintenance (TCM) for each lower-order path, such as virtual container-1 (VC-1), in a synchronous digital hierarchy (SDH) transmission path.

2. Description of the Related Art

With recent progress in digital communication networks based on synchronous network design, the use of SDH apparatus has been increasing. When constructing a network using SDH apparatus, the provision of a TCM facility becomes an essential requirement.

When there is a service path extending over different network suppliers, the TCM facility is used to monitor network communication quality in the section served by each individual network supplier. TCM is performed, for example, by detecting reception errors in each virtual container (VC) at both ends of a virtual path established along a monitoring section, and by comparing the detection results obtained at both ends, thereby determining the presence or absence of new errors caused along the monitoring section and the number of such errors. More specifically, when the virtual container exiting from the monitoring section contains a certain number of errors, for example, if it is found that the virtual container entering the monitoring section contains the same number of errors, it is shown that the control section itself is free from errors. On the other hand, when the virtual container exiting from the monitoring section contains errors despite no errors being contained in the virtual container entering it, this means that there is some sort of fault in the monitoring section. In this way, when a fault occurs in a path established extending over different network elements served by different network suppliers, it is possible to distinguish the responsible network supplier from other suppliers.

To accomplish this processing, it is necessary to transmit the error detection result at one end of the path in the monitoring section to the other end either by using a path overhead of a VC being carried in the same direction as the transporting direction of the VC under inspection or by using a path overhead of a VC being carried in the opposite direction to the transporting direction of the VC under inspection. For higher-order paths such as the VC3/VC4 paths conforming to CCITT recommendations and the STS-1 path used in SONET under ANSI standards in North America, work is in progress for the standardization of TCM for transmission of detection results by a data link method using an overhead bit, conforming to the LAPD protocol.

However, for lower-order paths, since the number of paths accommodated in one transmission path is large (for example, one VC-4 contains 21 VC-12's), the same technique as used for higher-order paths would require extremely large circuitry, and is therefore impracticable. Under such circumstances, work on standardization has so far seen little progress.

On the other hand, in the lower-order path TCM method currently under study by CCITT, the Z6 byte of a lower-order path is assigned to TCM bits, with the more significant three bits defined as the incoming error count (IEC) and the less significant five bits as the tandem connection data channel, for transmission of the IEC. This method is simple compared to the technique used for higher-order paths.

However, with the lower-order path TCM method under study by CCITT, each time the Z6 byte is changed for transmission of IEC when performing TCM on a path, the result of BIP (Bit Interleave Parity)-2 indicating the parity calculation result also changes, requiring recalculation and reinsertion, and hence the problem of increased circuit complexity.

SUMMARY OF THE INVENTION

The present invention is intended to overcome the above problem in the prior art, and it is an object of the invention to provide a TCM method and apparatus, wherein the need for recalculation of BIP-2 is eliminated even when performing TCM on a lower-order path, thereby providing inexpensive TCM for an SDH apparatus while achieving a reduction in circuit complexity.

According to the present invention, there is provided a method of detecting errors caused along a designated section within a communication network for a virtual path established along the entire length of the designated section, comprising the steps of: detecting, at first and second end points of a detection section, errors contained in a first virtual container transported along the virtual path; extracting at the first end point a first path overhead contained in a second virtual container to be transported from the first end point toward the second end point; generating at the first end point a second path overhead containing data on the errors detected at the first end point, the second path overhead further containing a parity compensation bit having such a value as to provide the same parity thereto as the parity carried in the first path overhead; inserting the second path overhead into the second virtual container at the first end point; and determining at the second end point the number of errors caused along the section by reference to the data on the errors detected at the second end point and the data on the errors detected at the first end point and carried in the second path overhead contained in the second virtual container transported from the first end point.

According to the present invention, there is also provided an apparatus for detecting errors caused along a designated path within a communication network for a virtual path established along the entire length of the designated section, comprising: means for detecting errors in a first virtual container transported along the virtual path; means for extracting a first path overhead contained in a second virtual container to be transported along the virtual path; means for generating a second path overhead containing data on the detected errors, the second path overhead further containing a parity compensation bit having such a value as to provide the same parity thereto as the parity carried in the first path overhead; means for inserting the second path overhead into the second virtual container; and means for determining the number of errors caused along the section by reference to the data on detected errors carried in the first path overhead extracted by the extracting means and to the data on the errors detected by the detecting means.

DESCRIPTION OF THE DRAWINGS

FIG. 6 is a diagram showing an example of the POHa according to the second embodiment of the invention;

FIG. 7 is a diagram showing an example of the POHa according to a third embodiment of the invention;

DESCRIPTION OF THE PREFERRED EMBODIMENTS

Figure 1:
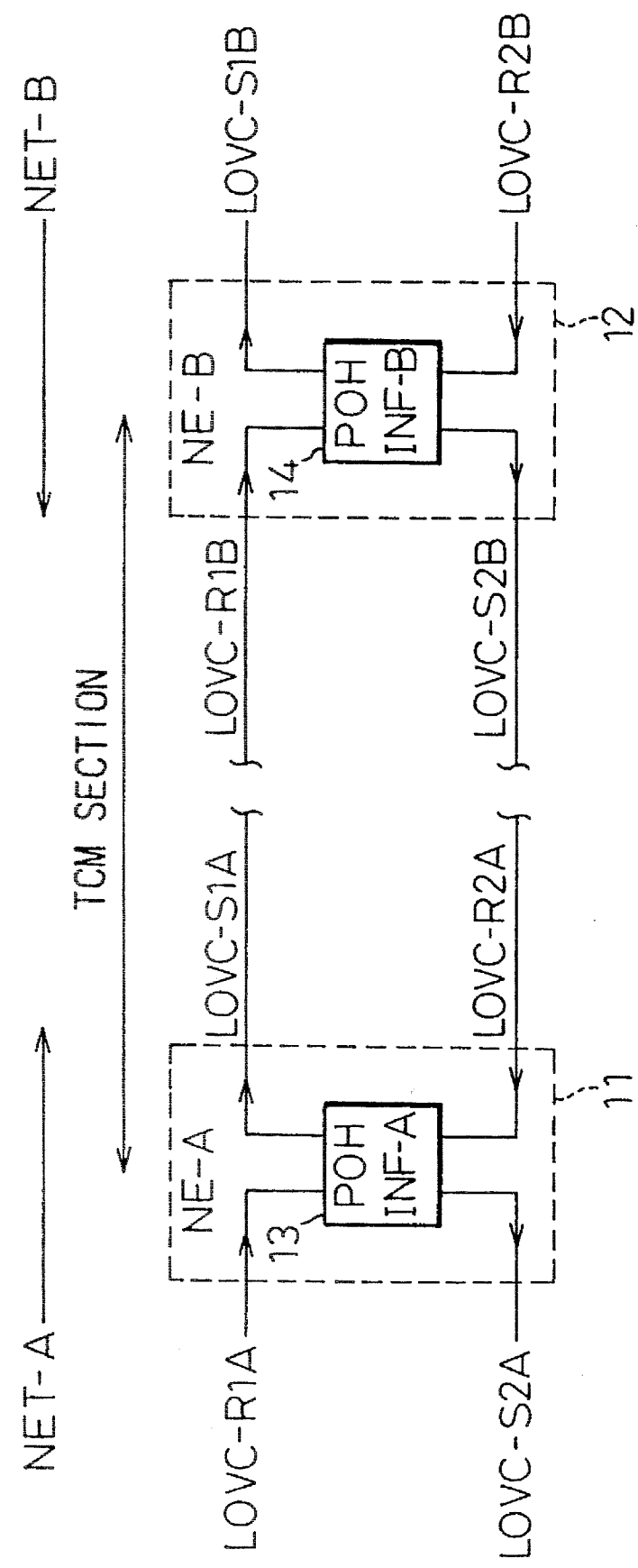
FIG. 1 is a diagram showing an example of a network configuration to which the present invention is applied.

FIG. 1 shows an example of a network configuration to which the present invention is applied. The reference numerals 11 and 12 designate network elements belonging to different networks A and B and having path overhead (POH) interface circuits 13 and 14, respectively. With a TCM section set up between the network elements 11 and 12, the POH interface circuits 13 and 14, monitor errors occurring along this section by using a POHa byte, a path overhead byte (including the Z6 byte) undefined by CCITT recommendations.

In the network element 11, a received lower-order virtual container LOVC-R1A intended in a first direction from network A to network B enters the POH interface 13, where it undergoes POHa byte processing and is converted into a transmit lower-order virtual container LOVC-S1A for transmission to the network element 12. In the network element 12, a received lower-order virtual container LOVC-R1B enters the POH interface 14, where it undergoes POHa byte processing and is converted into a transmit lower-order virtual container LOVC-S1B for transmission onto the network B.

Likewise, a received lower-order virtual container LOVC-R2B intended in a second direction from network B to network A undergoes POHa processing in the network element 12 for conversion into a transmit lower-order virtual container LOVC-S2B, and in the network element 11, a received lower-order virtual container LOVC-R2A undergoes POHa processing for conversion into a transmit lower-order virtual container LOVC-S2A.

Figures 2, 3:
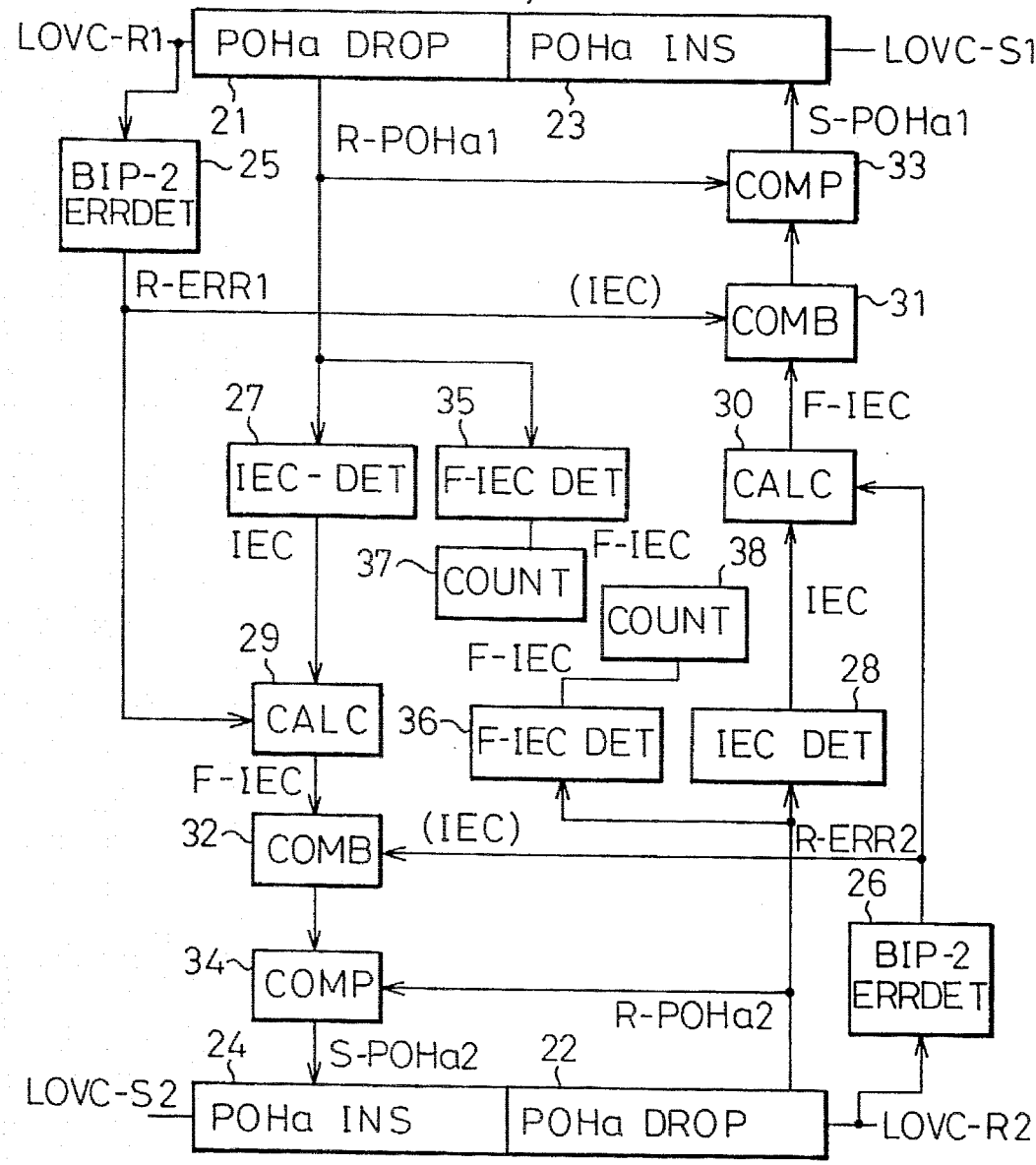
FIG. 2 is a block diagram showing a detailed configuration of a POH interface circuit 13, 14 according to a first embodiment of the invention.
FIG. 3 is a diagram showing an example of a POHa format according to the first embodiment of the invention.

FIG. 2 shows a first embodiment of the present invention. A detailed configuration of the POH interface circuit 13, 14 in FIG. 1 is shown here.

In FIG. 2, POHa extractors 21 and 22 extract received path overheads R-POHa1 and R-POHa2 from the received lower-order virtual containers LOVC-R1 and LOVC-R2, respectively.

POHa inserters 23 and 24 insert transmit path overheads S-POHa1 and S-POHa2 into the transmit lower-order virtual containers LOVC-S1 and LOVC-S2, respectively.

BIP-2 error detectors 25 and 26 detect received error counts R-ERR1 and R-ERR2 by using the bit interleave parity (BIP-2) of V5 byte in the path overheads (POH) of the received lower-order virtual containers LOVC-R1 and LOVC-R2, respectively.

IEC detectors 27 and 28 extract incoming error counts (IEC) from the received path overheads R-POHa1 and R-POHa2, respectively.

Arithmetic circuits 29 and 30, respectively, perform arithmetic operations to calculate the number of errors (F-IEC) caused along the TCM section by reference to the reception error counts R-ERR1, R-ERR2 detected from the received lower-order virtual containers LOVC-R1, LOVC-R2 and the IECs extracted from the received path overheads R-POHa1, R-POHa2.

Combiners 31 and 32, respectively, combine the reception error counts R-EER1, R-ERR2 in the received lower-order virtual containers LOVC-R1, LOVC-R2 with the respective F-IECs in the received lower-order virtual containers LOVC-R2, LOVC-R1 transported in the opposite direction, to obtain a POHa format.

Compensators 33 and 34, respectively, compare the received path overheads R-POHa1, R-POHa2 with the POHa's fed from the respective combiners; each compensator generates a parity compensation bit COMP and appends it to the POHa fed from the associated combiners so that the parity of the POHa fed from the associated combiners becomes equal to the parity of the received POHa. The transmit path overheads S-POHa1, S-POHa2 are thus produced.

F-IEC detectors 35 and 36 extract F-IECs from the received path overheads R-POHa1 and R-POHa2, respectively. Counters 37 and 38 totalize the F-IEC values being fed from the F-IEC detectors 35 and 36, respectively.

FIG. 3 shows an example of the POHa format. As shown, three bits are assigned to the incoming error count (IEC), two bits to the parity compensation bits (COMP), and three bits to the TCM section error count (F-IEC).

Figure 4:
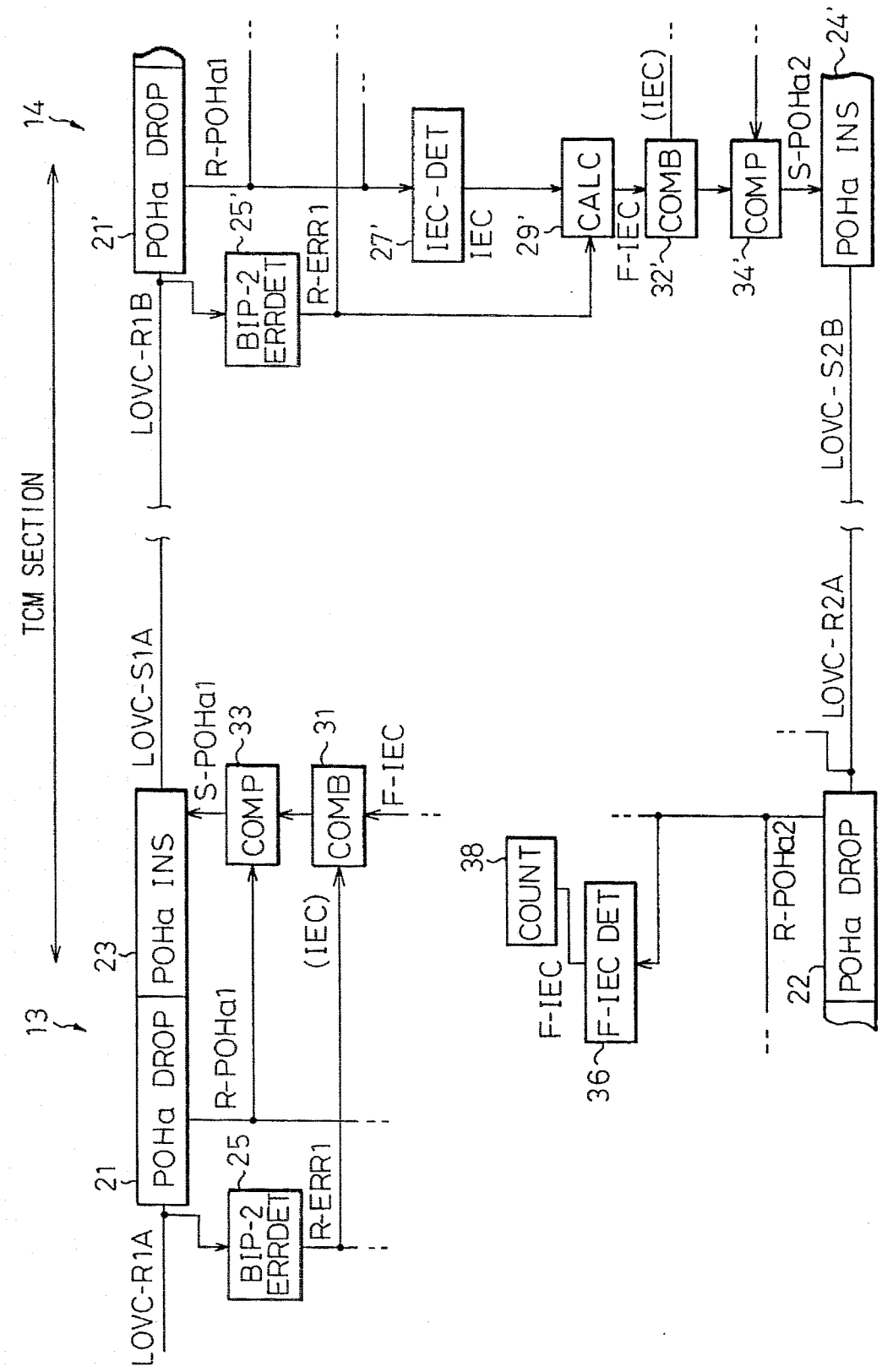
FIG. 4 is a diagram for explaining the operation of the first embodiment of the invention.

FIG. 4 is a diagram for explaining the TCM operation of the POH interface circuits 13, 14 shown in FIGS. 1 and 2.

In FIG. 4, the BIP-2 error detector 25 detects the reception error count R-ERR1 from LOVC of the received lower-order virtual container LOVC-R1A intended in the first direction. The reception error count, R-ERR1, is fed to the combiner 31 as the incoming error count IEC. At the same time, the error count F-IEC (to be described later), which represents the number of errors caused along the TCM section in the second direction, is supplied to the combiner 31. The combiner 31 passes the incoming error count IEC and the error count F-IEC to the compensator 33.

By reference to the parity of the received path overhead R-POHa1 extracted by the POHa extractor 21, the compensator 33 sets the fifth bit to 0 or 1, whichever makes the parity for the odd-numbered bits (bit 1, 3, 5 and 7) in the input from the combiner 31 equal to the parity for the odd bits in R-POHa1, and sets the fourth bit to 0 or 1, whichever makes the parity for the even-numbered bits (bit 2, 4, 6 and 8) equal to the parity for the even bits in the R-POHa1, thereby forming the transmit path overhead S-POHa1.

The POHa inserter 23 inserts the S-POHa1 into the signal transferred from the POHa extractor 21, to form LOVC of the transmit lower-order virtual container LOVC-S1A. Thus, the parity of the transmit lower-order virtual container LOVC-S1A becomes the same as the parity of the received lower-order virtual container LOVC-R1A, so that there is no need to recalculate BIP-2.

In FIG. 4, the transmit lower-order virtual container LOVC-S1A transmitted from the POH interface circuit 13 is input to the POH interface circuit 14 as the received lower-order virtual container LOVC-R1B.

The BIP-2 error detector 25' detects the reception error count R-ERR1 from the received lower-order virtual container LOVC-R1B, and the POHa extractor 21' extracts the path overhead R-POHa1. Further, the IEC detector 27' extracts the incoming error count IEC from R-POHa1. In the arithmetic circuit 29', the IEC extracted by the IEC detector 27' is subtracted from the reception error count R-ERR1 detected by the BIP-2 error detector 25', and the result is output as F-IEC.

The F-IEC output from the arithmetic circuit 29' represents the difference between the number of errors detected at the input of the network element 11 and that detected at the input of the network element 12, and this difference indicates the number of errors caused along the TCM section in the first direction. The F-IEC is passed through the combiner 32', the compensator 34', and the POHa inserter 24', and inserted into the transmit lower-order virtual container LOVC-S2B to be transmitted in the second direction.

The transmit lower-order virtual container LOVC-S2B transmitted from the POH interface circuit 14 is input to the POH interface circuit 13 as the received lower-order virtual container LOVC-R2A.

The POHa extractor 22 extracts the received path overhead R-POHa2 from the received lower-order virtual container LOVC-R2A transported along the second direction, and then, the F-IEC detector 36 extracts F-IEC from R-POHa2. The F-IEC thus extracted represents the number of errors per frame of the low-order LOVC, detected at the POH interface 14. This error count varies from frame to frame.

The counter 38 totalizes the F-IEC counts for one frame period. The number of errors that can be detected by BIP-2 is two per frame; therefore, the counter 38 need only have a maximum counting capacity equal to 2×frame frequency ×n (seconds). An MPU (not shown) having an error count display function reads the count value from the counter 38 and displays it on a man-machine interface.

With the above sequence of operations, the network element 11 can monitor the errors that have occurred in the virtual container during transmission from the network element 11 to the network element 12. Since the POH interfaces 13 and 14 are symmetrical in configuration as shown in FIG. 2, it will be easily understood that monitoring of errors for a virtual container transported in the opposite direction can be accomplished in the same manner as described above.

TCM is effective in situations where errors occur, but error indications would be rendered useless unless reliability is ensured for IEC and F-IEC.

Figure 5:
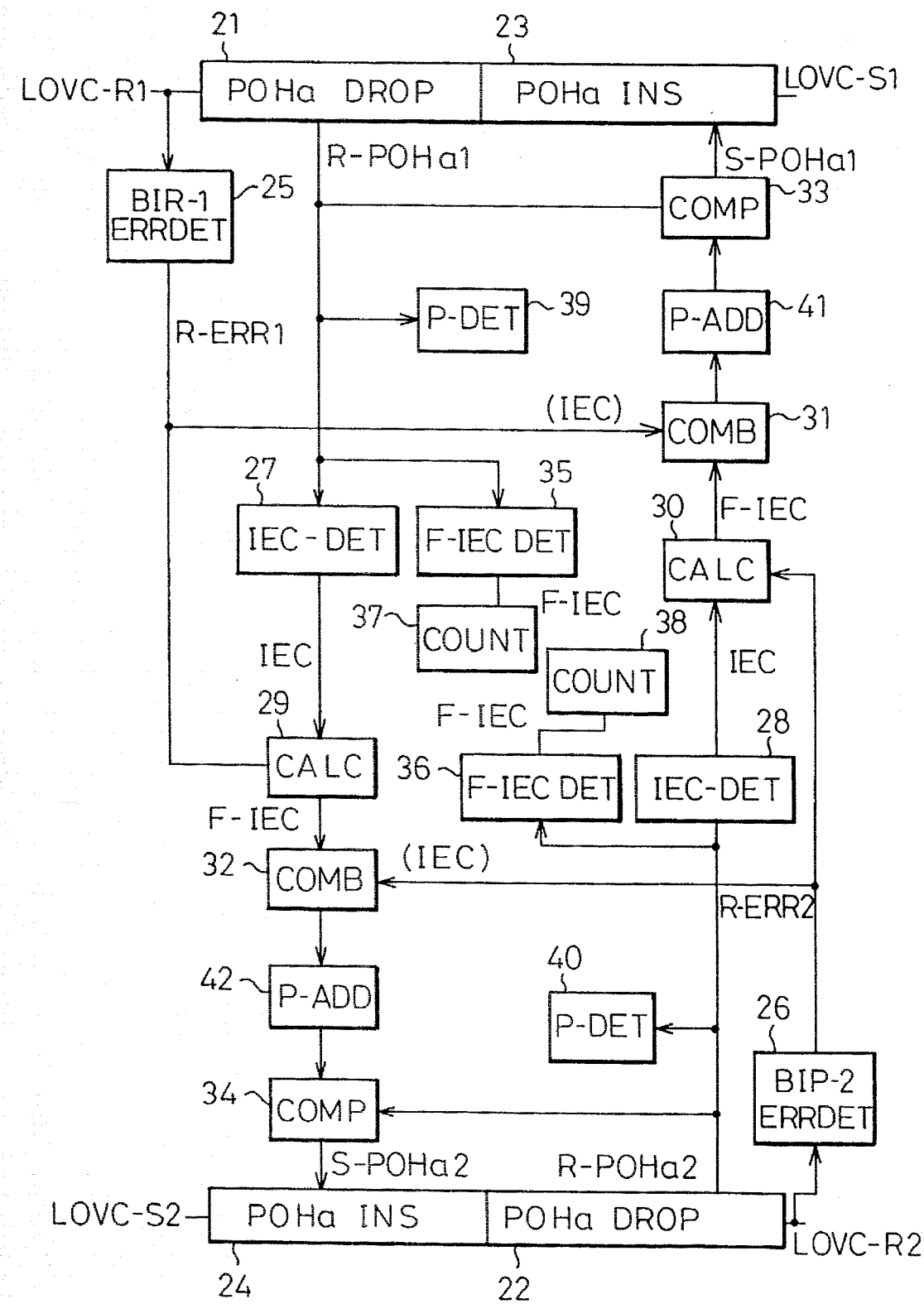
FIG. 5 is a block diagram showing a detailed configuration of the POH interface circuit 13, 14 according to a second embodiment of the invention.

FIG. 5 shows a second embodiment of the invention where provisions are made to verify the reliability of IEC and F-IEC. The same parts as those shown in FIG. 2 are designated by the same reference numerals. The numerals 39 and 40 are parity detectors for detecting the parity of the received path overheads R-POHa1 and R-POHa2, respectively. The numerals 41 and 42 are parity bit adders for adding parity bits to the transmit path overheads S-POHa1 and S-POHa2, respectively.

FIG. 6 shows the POHa format according to the second embodiment. In the figure, P indicates the parity bit for IEC and F-IEC, appended to increase reliability.

In FIG. 5, the parity detector 39 calculates the parity of the received path overhead R-POHa1 extracted by the POHa extractor 21, while the parity detector 40 calculates the parity of the received path overhead R-POHa2 extracted by the POHa extractor 22. The parity bit adder 41 adds parity bits to the transmit path overhead S-POHa1 to be inserted by the POHa inserter 23, while the parity bit adder 42 adds parity bits to the transmit path overhead S-POHa2 to be inserted by the POHa inserter 24.

FIG. 7 shows the POHa format according to a third embodiment of the invention. In the FIGS, P1 and P2 are parity bits separately appended to IEC and F-IEC, respectively.

In the case of the received lower-order virtual container LOVC-R2A in the network element 11 shown in FIG. 1, the IEC carried therein is transmitted in the second direction and represents the number of errors contained in the received lower-order virtual container LOVC-R2B in the network element 12, while the F-IEC represents the number of errors caused along the TCM section in the first direction. Thus IEC and F-IEC have meanings independently of each other; therefore, in a case where there is a parity error in IEC, for example, if there is no parity error in F-IEC, the TCM section can be considered as having been monitored normally. Thus the format shown in FIG. 7 provides better TCM performance than the format shown in FIG. 6.

According to the present invention, the TCM facility can be realized with a simple hardware configuration, by using the technique disclosed in either embodiment shown in FIG. 2 or FIG. 5. However, in the case of a large-capacity transmission path such as STM-16, there are 1008 paths at the VC12 level, in which case the circuitry of the entire apparatus becomes large. Also, within a single apparatus, no such situations are generally expected where TCM is set for all the lower-order paths. One possible way to reduce the circuit size is, therefore, to provide a common POH interface circuit for a number of lower-order paths, and a switch for switching between the paths.

Figure 8:
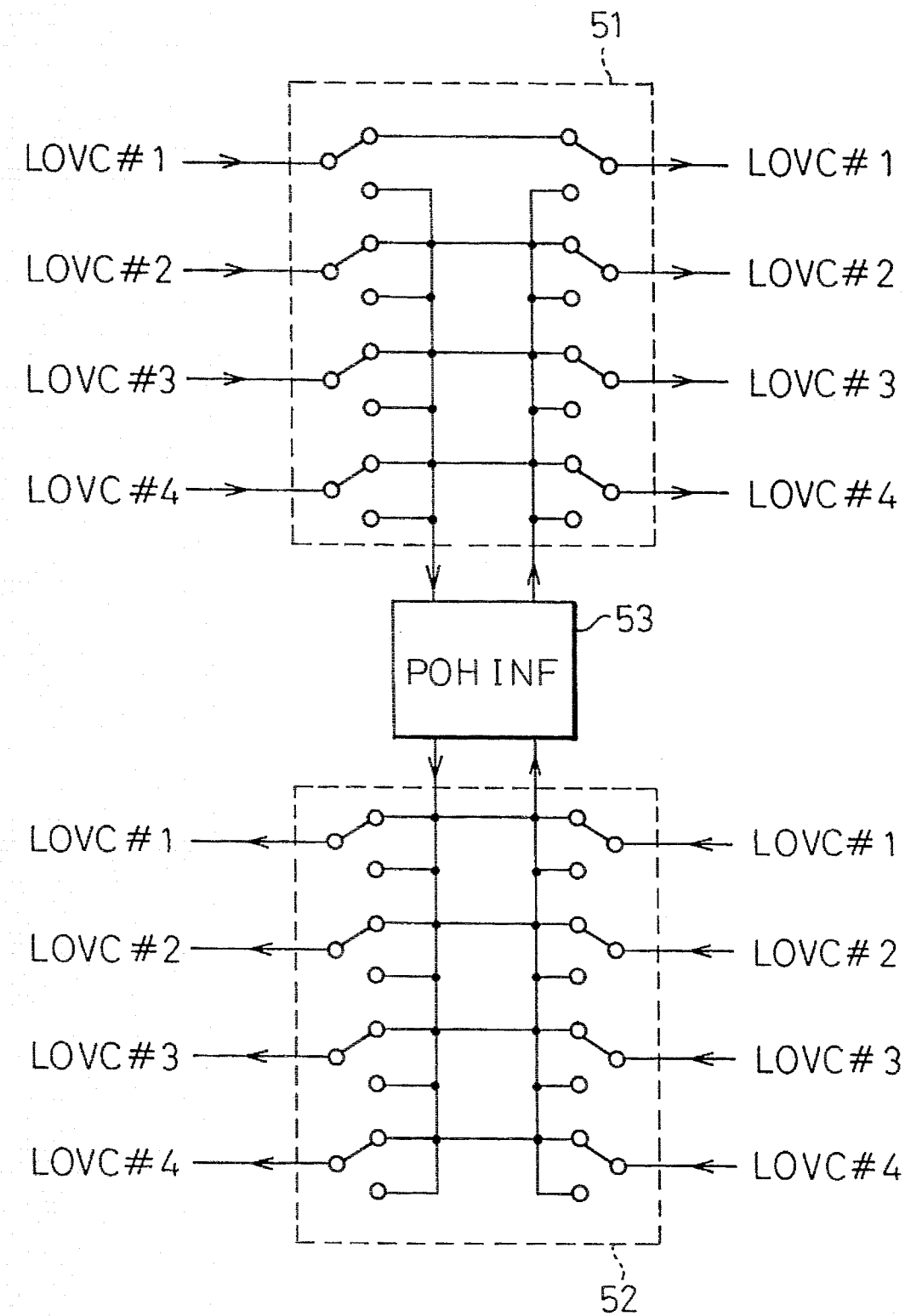
FIG. 8 is a diagram showing an example of a switch select method for the POH interface circuit.

FIG. 8 shows a first switch select method for the POH interface circuit, illustrating an example using a 1:4 switch (selector). The selector to be used is not limited to the 1:4 configuration, but any 1:z configuration can be used for a further reduction in size.

The numerals 51 and 52 are selectors. Any one of the four lower-order paths LOVC#1–LOVC#4 can be selected for connection to the POH interface circuit 53 to perform TCM. Therefore, according to the method of FIG. 8, the circuitry necessary for TCM can be reduced in size.

Using a plurality of such selectors as shown in FIG. 8, TCM can be performed on each lower-order path within the apparatus. However, if the value z is made extremely large, the circuit size can be reduced, but the number of paths on which TCM can be performed will also be reduced. Furthermore, since TCM cannot be performed simultaneously on the lower-order paths accommodated in the same selector, operational constraints will arise.

Figure 9:
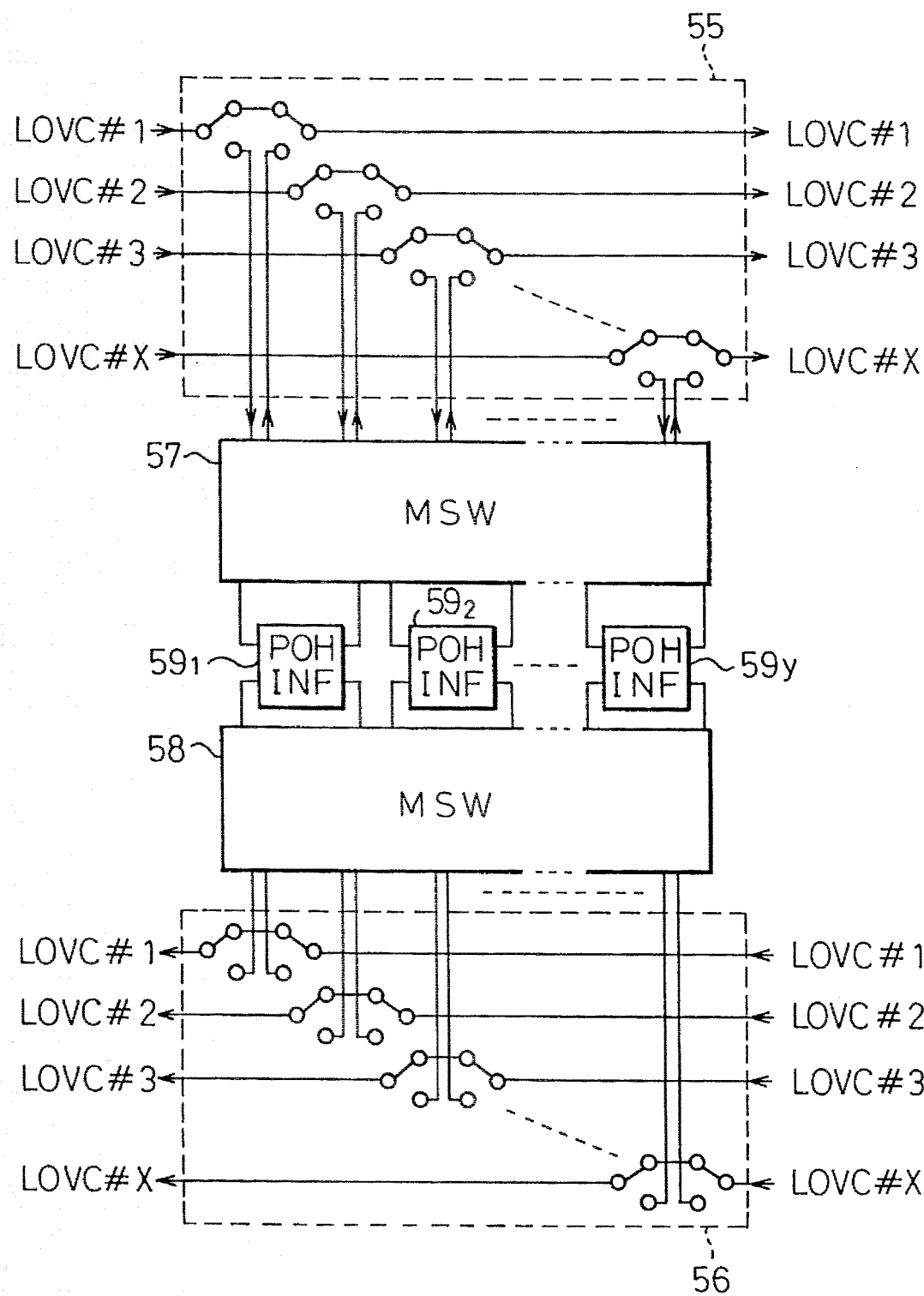
FIG. 9 is a diagram showing another example of a switch select method for the POH interface circuit.

FIG. 9 shows a second switch select method for the POH interface circuit, wherein an x:y (x>y) matrix switch is provided between the lower-order paths and the POH interface circuit.

The numerals 55 and 56 are selectors each consisting of x switches. Using these switches, x lower-order paths, LOVC#1–LOVC#x, are selectively connected to MSWs 57 and 58. The MSWs 57 and 58 select arbitrary ports from x pairs of ports for connection to y pairs of ports, while short-circuiting the unselected ports. The numerals $59_1$ to $59_4$ indicate a number, y, of POH interface circuits which perform TCM on the y lower-order paths selected by the MSWs 57 and 58, respectively.

According to the method shown in FIG. 9, since arbitrarily selected lower-order paths can be connected to the POH interface circuits in a flexible manner, operational constraints can be eliminated. The matrix switch is larger in circuit size than the selector, but in terms of circuit configuration, it can be constructed from a simple combination of gate circuits. Using gate array and similar technology, a compact, low-cost matrix switch can be realized.

Figure 10:
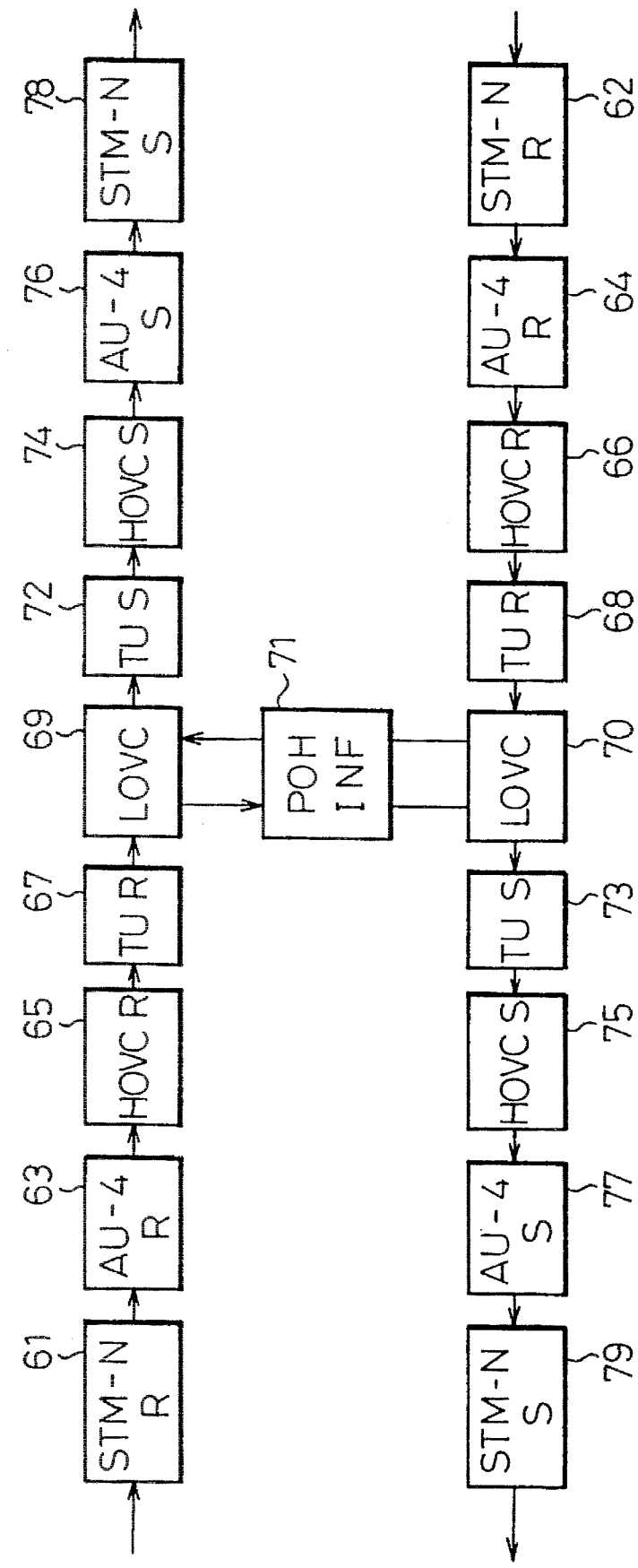
FIG. 10 is a block diagram of an SDH apparatus to which the present invention is applied.

FIG. 10 is a block diagram showing the configuration of an SDH apparatus to which the present invention is applied. In the figure, the numerals 61 and 62 are STM-N signal receivers; 63 and 64 are AU-4 signal receivers; 65 and 66 are HOVC receivers; 67 and 68 are TU signal receivers; 69 and 70 are LOVC sections; 71 is a POH interface circuit; 72 and 73 are TU signal transmitters; 74 and 75 are HOVC transmitters; 76 and 77 are AU-4 signal transmitters; and 78 and 79 are STM-N signal transmitters.

In any of the above-described embodiments, the number of reception errors, detected at the start point of a virtual container intended for transportation along the monitoring section, is transmitted to the end point, where the number of reception errors detected at the start point is subtracted from the number of reception errors detected at the end point, to calculate the number of errors caused along the monitoring section; then, the result of the calculation is carried in a virtual container to be transported in the opposite direction and is thus transmitted to the start point where the result is displayed. In an alternative configuration, the number of errors caused along the monitoring section and calculated at the end point may be displayed at the end point instead of returning it to the start point for display. In still another configuration, the number of errors detected at the end point may be transmitted to the start point by using a virtual container to be transported in the opposite direction, and the number of errors caused along the control section may be calculated at the start point. In such configurations, F-IEC need not be transmitted; in either case, if parity compensation bits COMP are used so that the BIP-2 calculation result of the entire virtual container remains unchanged, recalculation of BIP-2 is not necessary.

I claim:

1. A method of detecting errors caused along a detection section within a communication network for a virtual path established along the entire length of the detection section, comprising the steps of:

detecting, at first and second end points of the detection section, errors contained in a first virtual container transported along said virtual path;

extracting at said first end point a first path overhead contained in a second virtual container to be transported from said first end point toward said second end point;

generating at said first end point a second path overhead containing data on the errors detected at said first end point, said second path overhead further containing a parity compensation bit having such a value as to provide the same parity thereto as the parity of said first path overhead;

inserting said second path overhead into said second virtual container at said first end point; and determining at said second end point a number of errors caused along said detection section as an intra-section error count by reference to the data on the errors detected at said second end point and the data on the errors detected at said first end point and carried in said second path overhead contained in said second virtual container transported from said first end point.

2. The method according to claim 1, wherein said first virtual container is transported from said second end point toward said first end point.

3. The method according to claim 1, wherein said first virtual container is transported from said first end point toward said second end point.

4. The method according to claim 3, further comprising the steps of:

extracting at said second end point a third path overhead contained in a third virtual container to be transported from said second end point toward said first end point;

generating at said second end point a fourth path overhead containing the intra-section error count determined in the determining step, said fourth path overhead further containing a parity compensation bit having such a value as to provide the same parity thereto as the parity of said third path overhead; and inserting said fourth path overhead into said third virtual container at said second end point.

5. The method according to claim 4, further comprising the steps of:

totalizing at said first end point each intra-section error count contained in said fourth path overhead which is contained in said third virtual container transported from said second end point; and outputting the total value of the intra-section error counts.

6. The method according to claim 5, wherein said second path overhead further contains an intra-section error count determined on said virtual container which has been transported from said second end point toward said first end point, and said fourth path overhead further contains data on errors detected at said second end point from said virtual container which is to be transported from said second end point toward said first end point.

7. The method according to claim 6, wherein each of said second and said fourth path overheads further contain a parity bit for both the data on the detected errors and the intra-section error count.

8. The method according to claim 6, wherein each of said second and said fourth path overheads further contain a parity bit for the data on the detected errors and a parity bit for the intra-section error count.

9. An apparatus for detecting errors caused along a detection section within a communication network for a virtual path established along the entire length of the detection section, comprising:

means for detecting errors in a first virtual container transported along said virtual path;

means for extracting a first path overhead contained in a second virtual container to be transported along said virtual path;

means for generating a second path overhead containing data on the detected errors, said second path overhead further containing a parity compensation bit having such a value as to provide the same parity thereto as the parity of said first path overhead;

means for inserting said second path overhead into said second virtual container; and means for determining a number of errors caused along said detection section as an intra-section error count by reference to the data on detected errors carried in said first path overhead extracted by said extracting means and to the data of the errors detected by said detecting means.

10. The apparatus according to claim 9, wherein said second virtual container is transported in the opposite direction to the transporting direction of said first virtual container.

11. The apparatus according to claim 9, wherein said second virtual container is transported in the same direction as the transporting direction of said first virtual container.

12. The apparatus according to claim 11, further comprising:
   means for extracting a third path overhead contained in a third virtual container to be transported along said virtual path in the opposite direction of the transporting direction of said first and said second virtual containers;
   means for generating a fourth path overhead containing the intra-section error count determined by said determining means, said fourth path overhead further containing a parity compensation bit having such a value as to provide the same parity thereto as the parity of said third path overhead; and
   means for inserting said fourth path overhead into said third virtual container.

13. The apparatus according to claim 12, further comprising:
   means for totalizing each intra-section error count contained in said fourth path overhead which is contained in said third virtual container; and
   means for outputting the total value of the intra-section error counts.

14. The apparatus according to claim 13, further comprising:
   a second intra-section error count determining means for determining the number of errors caused along the detection section as an intra-section error count in the transporting direction of said third virtual container; and
   a second error detecting means for detecting errors along the transporting direction of said third virtual container,
   wherein said second path overhead further contains data on the intra-section error count determined by said second intra-section error count determining means, and said fourth path overhead further contains data on the errors detected by said second error detecting means.

15. The apparatus according to claim 14, wherein each of said second and said fourth path overheads further contain a parity bit for both the data on the detected errors and the intra-section error count.

16. The apparatus according to claim 14, wherein each of said second and said fourth path overheads further contain a parity bit for the data on the detected errors and a parity bit for the intra-section error count.

17. An apparatus for detecting errors caused along a detection section within a communication network for a plurality of virtual paths established along the entire length of the detection section, comprising:
   a POH (path overhead) interface circuit which, when connected at one end of the detection section to first- and second-direction lines of one of said plurality of virtual paths, detects errors in said connected virtual path within said detection section by using a path overhead of said connected virtual path;
   a first selector for selecting one of said plurality of virtual paths and connecting said first-direction line of said selected virtual path to said POH interface circuit; and
   a second selector for connecting said second-direction line of said virtual path selected by said first selector to said POH interface circuit in interlocking fashion with said first selector.

18. An apparatus for detecting errors caused along a detection section within a communication network for a plurality of virtual paths established along the entire length of the detection section, comprising:
   a plurality of POH path overhead interface circuits each of which, when connected at one end of a detection section to first- and second-direction lines of one virtual path, detects errors in said connected virtual path within said detection section;
   a first matrix switch for selecting a number of virtual paths from among said plurality of virtual paths and connecting the first-direction lines of said selected virtual paths respectively to said POH interface circuits; and
   a second matrix switch for connecting the second-direction lines of said virtual paths selected by said first matrix switch respectively to said POH interface circuits in interlocking fashion with said first matrix switch.

* * * * *